# United States Patent Office 3,096,658
Patented July 9, 1963

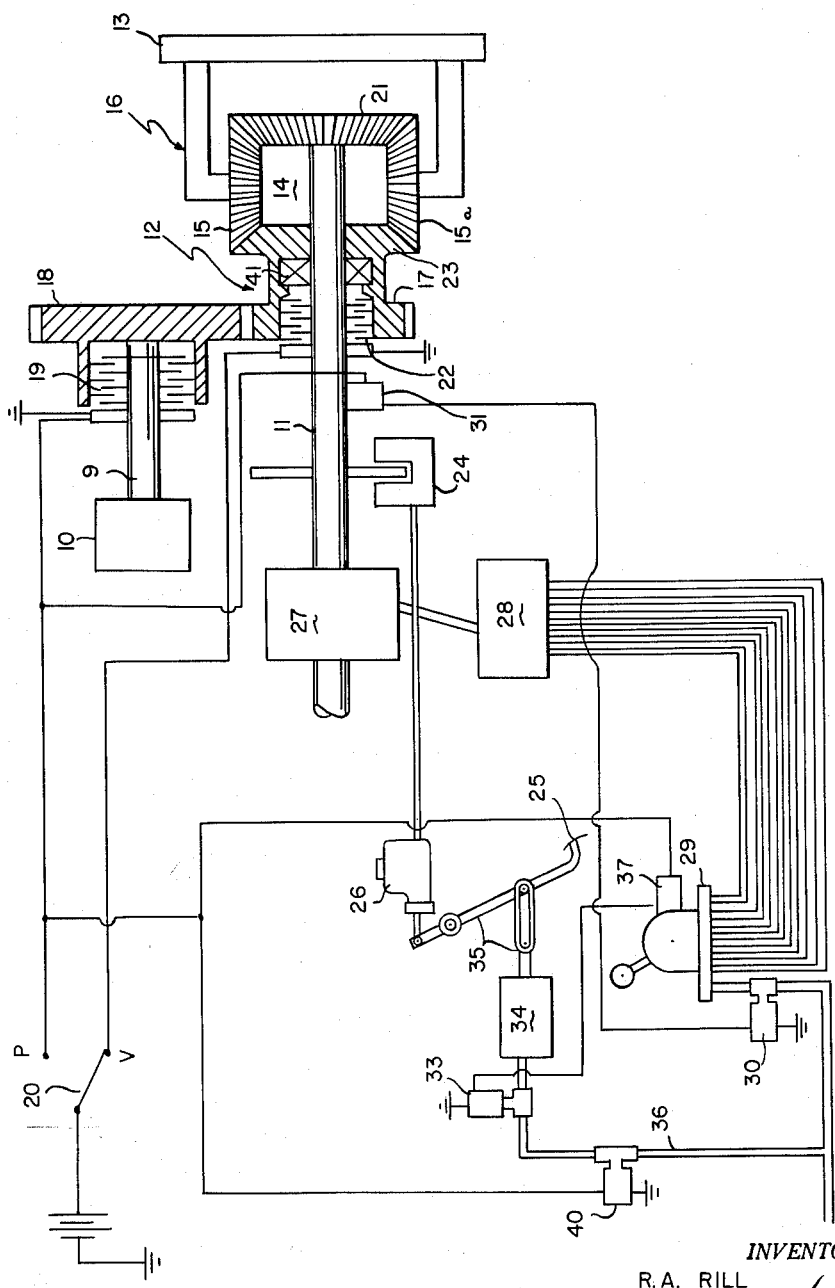

3,096,658
POWER DIVIDER FOR PUMP CONTROL SYSTEM
Russell A. Rill and Kenneth A. McLyman, Clintonville, Wis., assignors to the United States of America as represented by the Secretary of the Air Force
Filed Nov. 3, 1961, Ser. No. 150,106
4 Claims. (Cl. 74—15.84)

This invention relates to a power dividing system for a pump operating vehicle.

One object of the invention is to provide a power divider for a pump control system capable of selectively providing vehicle or pump operation alone or combined operation of the vehicle and pump.

This and other objects will be more fully understood from the following detailed description taken with the drawing wherein:

The single FIGURE shows a schematic diagram of the power divider for a pump control system.

In the use of aircraft fire fighting trucks, it is sometimes desirable to have pump operation while the vehicle is in motion. Previously, when this dual operation was desired, separate engines were used for the pump and for driving the vehicle. According to this invention, a power dividing system is provided which is capable of giving either dual operation or separate operation of the vehicle or pump.

Referring now to the drawing, reference number 9 refers to a shaft for driving a fire truck pump 10 and reference number 11 refers to a shaft for driving the vehicle. A power dividing system shown generally at 12 is connected between the vehicle flywheel 13 and shafts 9 and 11.

Shaft 11 is connected to the flywheel through a differential, indicated generally at 14, pinions 15 and 15a, and differential carrier, indicated at 16.

The pump shaft 9 is driven through the differential 14, gears 17 and 18, and magnetic clutch 19. The shaft 11 is connected to the differential by means of differential side gear 21. A magnetic clutch 22 is provided and, when engaged, locks the shaft 11 against relative rotation with respect to gear 17 and differential side gear 23. The drive mechanism is switched between vehicle operation and a combined vehicle and pump operation by means of a switch 20.

A brake mechanism shown schematically at 24 is provided to lock the vehicle drive shaft 11 against rotation when the pump is to be driven alone. Brake 24 is operated by means of a foot pedal indicated at 25 and master cylinder indicated at 26. A transmission shown schematically at 27 is controlled by transmission range control 28 which is pneumatically coupled to the range switch valve 29. A solenoid valve 30 in the air supply line to the range valve 29 is controlled by a governor 31 to prevent shifting at excessive speeds when switch 20 is in position "P" which indicates pump operation. The solenoid valve 33 is connected between an air cylinder 34 and an air supply 36 and is operated by a switch 37 to engage the brake 24 through linkage 35, in the usual manner, when the range shift valve 29 is in its neutral position. A solenoid valve 40 is connected in the air supply line 36 to permit operation of the air cylinder 34 only when the switch 20 is in the pump operation position. An over-running clutch 41 is provided to permit operation of the pump with low loads on shaft 11.

In operation of the device, when the switch 20 is in the vehicle operation position as shown, clutch 19 is disengaged, governor valve 31 is inoperative, solenoid valve 40 is closed, and clutch 22 is engaged. When magnetic clutch 22 is engaged, gears 17 and 23 are locked against rotation with respect to shaft 11. Thus no relative rotation between side gears 21 and 23 is permitted so that the differential 14 is inoperative and shaft 11 is rigidly coupled to the flywheel 13. Switch 37 is out of the circuit so that the brake 24 is operated only by means of foot pedal 25.

When the switch 20 is shifted in the "P" position, magnetic clutch 19 is engaged and magnetic clutch 22 is disengaged. With clutch 22 disengaged, relative rotation between the shaft 11 and gear 17 is permitted so that both shafts 9 and 11 may be driven through the differential 14. In this position of the switch, governor 31, switch 37 and solenoids 33 and 40 are also made operative. If "pump only" operation is desired, range shift valve 29 may be moved to its neutral position thus causing switch 37 to energize solenoid 33 to set the brake 24 through linkage 35 and master cylinder 26. With brake 24 set, shaft 11 is locked against rotation so that all the power supplied to the differential 14 is transmitted to the shaft 9. It is obvious also that foot pedal 25 may be used to partially engage brake 24 which would permit some rotation of shaft 11 and thus act as a control of the division of power between shafts 9 and 11.

There is thus provided a power divider for a pump control system which may be used for vehicle or pump operation alone or combined operation of the vehicle and pump.

While a certain specific embodiment has been described in detail, it is obvious that certain changes may be made without departing from the spirit and scope of the invention.

We claim:

1. A power dividing system for a pump operating vehicle comprising: a vehicle drive shaft, a flywheel, a differential having two pinions and a first and a second side gear, means for connecting said pinions to said flywheel, said vehicle drive shaft being connected to said first side gear, a pump drive shaft, a pump drive gear, means attached to said second side gear for driving said pump drive gear, a first magnetic clutch connected between said last named means and said vehicle drive shaft, a second magnetic clutch connected between said pump drive gear and said pump drive shaft, means for selectively energizing said first or said second magnetic clutches, a braking means coupled to said vehicle drive shaft and means for selectively operating said braking means.

2. A power dividing system for a pump operating vehicle comprising: a vehicle drive shaft, a plural speed transmission connected to said vehicle drive shaft, means for changing the speed range of said transmission, a flywheel, a differential having two pinions and a first and a second side gear, means for connecting said pinions to said flywheel, said vehicle drive shaft being connected to said first side gear, a pump drive shaft, a pump drive gear, means attached to said second side gear for driving said pump drive gear, a first magnetic clutch connected between said last named means and said vehicle drive shaft, a second magnetic clutch connected between said pump drive gear and said pump drive shaft, means for selectively energizing said first or said second magnetic clutches, means, including a governor responsive to the speed of said vehicle drive shaft, for preventing operation of said transmission speed changing means at speeds above a predetermined speed when said second magnetic clutch is engaged, a braking means coupled to said vehicle drive shaft, means for selectively operating said braking means, means, including a switch responsive to said speed changing means, for engaging said brake when said transmission is in its neutral position and means for permitting the operation of said last named means only when said second magnetic clutch is engaged.

3. A power dividing system for a pump operating vehicle comprising: a vehicle drive shaft, a plural speed transmission connected to said vehicle drive shaft, means for changing the speed range of said transmission, a flywheel, a differential having two pinions and a first and a second side gear, means for connecting said pinions to said flywheel, said vehicle drive shaft being connected to said first side gear, a pump drive shaft, a pump drive gear, means attached to said second side gear for driving said pump drive gear, a first magnetic clutch connected between said last named means and said vehicle drive shaft, a second magnetic clutch connected between said pump drive gear and said pump drive shaft, means for selectively energizing said first or said second magnetic clutches, means connected between said vehicle drive shaft and said second side gear for maintaining high torque on said pump drive shaft during low load operation of said vehicle drive shaft, means, including a governor responsive to the speed of said vehicle drive shaft, for preventing operation of said transmission speed changing means at speeds above a predetermined speed when said second magnetic clutch is engaged, a braking means coupled to said vehicle drive shaft, means for selectively operating said braking means, means, including a switch responsive to said speed changing means, for engaging said brake when said transmission is in its neutral position and means for permitting the operation of said last named means only when said second magnetic clutch is engaged.

4. The device as claimed in claim 3 wherein said means for maintaining a high torque on said pump shaft during low load operation of said vehicle drive shaft is an overrunning clutch.

References Cited in the file of this patent

UNITED STATES PATENTS

| | | |
|---|---|---|
| 1,827,655 | Haubert | Oct. 13, 1931 |
| 2,959,070 | Flinn | Nov. 8, 1960 |